United States Patent
Korten et al.

(10) Patent No.: US 12,466,130 B2
(45) Date of Patent: Nov. 11, 2025

(54) 3D PRINTING SYSTEM AND METHOD FOR MANUFACTURING WORKPIECES AND ADAPTER SET FOR ATTACHING WORKPIECE HOLDERS TO A 3D PRINTING DEVICE

(71) Applicant: SOLVENTUM INTELLECTUAL PROPERTIES COMPANY, Maplewood, MN (US)

(72) Inventors: Malte Korten, Moorenweis (DE); Andreas G. Herrmann, Munich (DE); Bastian P. Kirchner, Fuerstenfeldbruck (DE); Gioacchino Raia, Tuerkenfeld (DE); Daniel D. Oberpertinger, Herrsching (DE); Christian A. Richter, Feldafing (DE); Anja Friedrich, Unterschleißheim (DE); Richard E. Raby, Lino Lakes, MN (US); Dietmar Blees, Loehne (DE); Ralf M. Paehl, Melle (DE); Thomas K. Müller, Gauting (DE)

(73) Assignee: Solventum Intellectual Properties Company, Maplewood, MN (US)

( * ) Notice: Subject to any disclaimer, the term of this patent is extended or adjusted under 35 U.S.C. 154(b) by 128 days.

(21) Appl. No.: 18/024,629

(22) PCT Filed: Sep. 16, 2021

(86) PCT No.: PCT/IB2021/058458
§ 371 (c)(1),
(2) Date: Mar. 3, 2023

(87) PCT Pub. No.: WO2022/069987
PCT Pub. Date: Apr. 7, 2022

(65) Prior Publication Data
US 2023/0311410 A1    Oct. 5, 2023

(30) Foreign Application Priority Data

Oct. 2, 2020   (EP) .................................... 20199772

(51) Int. Cl.
*B29C 64/245*    (2017.01)
*B29C 64/124*    (2017.01)
(Continued)

(52) U.S. Cl.
CPC .......... *B29C 64/245* (2017.08); *B29C 64/124* (2017.08); *B29C 64/171* (2017.08);
(Continued)

(58) Field of Classification Search
CPC ....... B22F 12/30; B29C 64/245; B29C 64/30; B29C 64/35; B29C 64/171; B29C 64/176;
(Continued)

(56) References Cited

U.S. PATENT DOCUMENTS

| | | |
|---|---|---|
| 9,434,107 B2 | 9/2016 | Zenere |
| 2017/0266890 A1 | 9/2017 | Volk |

(Continued)

FOREIGN PATENT DOCUMENTS

| | | | |
|---|---|---|---|
| DE | 29907262 U1 * | 7/1999 | ............ B33Y 30/00 |
| WO | 2019155460 A1 | 8/2019 | |
| WO | 2020201943 A1 | 10/2020 | |

OTHER PUBLICATIONS

1507 Extended EP Search Report for EP20199772.3, Date Mar. 4, 2021, 3pgs.

(Continued)

*Primary Examiner* — Jerzi H Moreno Hernandez

(57) ABSTRACT

A 3D printing system is disclosed, comprising a 3D printing device with a build plate and at least two workpiece holders, each having a manufacturing surface for additive manufacturing. The system includes an adapter with recesses for (Continued)

receiving portions of the workpiece holders, allowing the workpiece holders to be releasably attached to the build plate. The system also integrates post-processing devices controlled by a handling robot and a controller to streamline the manufacturing process, ensuring high precision and efficiency. Additionally, the disclosed technology covers a method for manufacturing at least two workpieces using the 3D printing system, which includes steps for hardening layers of material and removing workpieces post-production. Furthermore, the system includes an adapter set for attaching workpiece holders to the 3D printing device, enabling efficient transitions between different manufacturing stages and enhancing overall productivity.

10 Claims, 11 Drawing Sheets

(51) Int. Cl.
  *B29C 64/171* (2017.01)
  *B29C 64/176* (2017.01)
  *B29C 64/35* (2017.01)
  *B33Y 10/00* (2015.01)
  *B33Y 30/00* (2015.01)
  *B33Y 40/20* (2020.01)

(52) U.S. Cl.
  CPC ............ *B29C 64/176* (2017.08); *B29C 64/35* (2017.08); *B33Y 10/00* (2014.12); *B33Y 30/00* (2014.12); *B33Y 40/20* (2020.01)

(58) Field of Classification Search
  CPC ... B29C 64/182; B29C 64/379; B29C 64/124; B33Y 30/00; B33Y 40/20
  See application file for complete search history.

(56) References Cited

U.S. PATENT DOCUMENTS

| | | | |
|---|---|---|---|
| 2018/0056389 A1* | 3/2018 | Grant | B29C 64/245 |
| 2020/0139434 A1* | 5/2020 | Madinger | B33Y 10/00 |
| 2020/0238446 A1* | 7/2020 | Worthing, Jr. | B33Y 30/00 |
| 2020/0238615 A1 | 7/2020 | Staal et al. | |

OTHER PUBLICATIONS

International Search Report for PCT International Application No. PCT/IB2021/058458, mailed on Nov. 22, 2021, 5 pages.

* cited by examiner

3D PRINTING SYSTEM AND METHOD FOR MANUFACTURING WORKPIECES AND ADAPTER SET FOR ATTACHING WORKPIECE HOLDERS TO A 3D PRINTING DEVICE

CROSS REFERENCE TO RELATED APPLICATIONS

This application is a national stage filing under 35 U.S.C. 371 of PCT/IB2021/058458, filed Sep. 16, 2021, which claims the benefit of European Application No. 20199772.3, filed Oct. 2, 2020, the disclosures of which are incorporated by reference in their entireties herein.

In recent years, the use of additive manufacturing by means of 3D printing systems to manufacture workpieces has become more widespread. Thus, many industrial sectors use 3D printing systems to manufacture a wide range of products, ranging from everyday household items to more sophisticated items, such as items for medical use. Thus, for instance, 3D printing systems are also often used to manufacture dental objects, such as dental crowns and bridges, and orthodontic appliances, such as aligners and spring retainers.

One available 3D printing system is referred to as Fused Deposition Modeling (FDM), in which a thermoplastic filament is fed through a hot extruder to soften the plastic. The softened plastic is then placed by a print head in layers to create a 3D printed object.

Higher surface qualities can be achieved by resin-based 3D printing systems, which include Stereolithography Apparatus (SLA) systems. Like FDM systems, SLA systems use an additive method to produce a physical object by applying a material to the workpiece layer by layer.

SLA systems are based on the concept of curing a photosensitive polymer material, usually a liquid resin, by projecting a light pattern from a light module onto a layer of hardenable resin. The light module can be a laser or a digital projector, wherein the systems using digital projectors are often referred to as Digital Light Processing (DLP) systems.

Multijet Printing (MJP) is a further 3D printing technology used to manufacture workpieces. Similar to SLA, an MJP system uses light, in most cases UV light, to crosslink a photopolymer. However, rather than scanning a laser to cure layers, a printer head jets droplets of the photopolymer in the shape of the first layer. A light source, which in most cases is attached to the printer head, polymerizes or cures the polymer and forms the shape of the layer. A build platform then displaces the workpiece and more material is deposited onto the previous layer. This process is repeated until the part has completed printing.

3D printing systems, such as the 3D printing systems described above, typically comprise a build plate having a build surface onto which the workpiece is printed. Once the workpiece has been printed onto the build surface of the build plate, the workpiece is typically removed from the build plate by scraping the printed workpiece from the build surface of the build plate by means of a removal tool, for instance by means of a spatula. The removal tool is thereby typically handled manually by a user.

A tip of the removal tool is thereby typically placed on the build surface of the build plate and a force is exerted on the removal tool along the build surface towards the printed workpiece in order to scrape the workpiece from the build surface.

Once removed from the build plate, the workpiece is then in most cases displaced to post-processing stages, such as cleaning and/or curing and/or surface finishing stages, in order to complete the manufacturing process of the workpiece. Thus, since the workpiece has not been cured at the point of removal of the workpiece from the build plate, the workpiece is often not completely hardened at the time of removal from the build plate.

Thus, mechanically removing the workpiece from the build plate by means of a removal tool, for instance as described above, can lead to damages to the workpiece due to the force applied to the workpiece by means of the removal tool. Damage may include scratching, abrading, fracturing, deforming, etc. In the case of incomplete resin cure at the time of removal, note that the workpiece may be softer and more easily deformed, such as by bending, curling, or twisting. These distortions may be subtle and could go unnoticed through subsequent processing steps which more fully cure and harden the workpiece. Once fully cured, the distortions become permanent.

Moreover, the removal process is a tedious and time-consuming process which often requires manual intervention in the manufacturing process and thus limits productivity.

Furthermore, the removal process of the workpiece from the build plate often does not completely remove all of the material of the workpiece from the build plate, thus leaving residual material on the build surface of the build plate. This requires the build plate to be cleaned of residual printing material after removal of the workpiece before a further workpiece can be printed onto the build plate. This requires further manual intervention into the manufacturing process and further limits productivity. Furthermore, the residual material and/or cleaning fluids on the build plate can cause contamination of the resin material used to manufacture the workpiece.

US 2020/238615 A1 (Staal et al.) relates to an additive manufacturing device comprising a modular build platform configured to hold or support during use at least one product, the build platform comprising at least one of a plurality of separable modular platform units.

US 2017/266890 A1 (Volk) describes an additive-manufacturing device with a build chamber and a build platform that is adjustably coupled to the build chamber.

Therefore, it is an object of the invention to provide a 3D printing system which enhances the productivity and efficiency of the 3D printing process.

This object is achieved by a 3D printing system comprising a 3D printing device for manufacturing at least two workpieces. The 3D printing system can be configured as any printing system in which the workpiece to be manufactured is additively printed onto a surface. Preferably, the 3D printing system can be configured as an SLA, an MJP or an FDM system, as described at the beginning. The 3D printing device comprises a build plate. The build plate typically provides the printing surface onto which the workpiece is additively printed in conventional 3D printing systems known from prior art.

The workpieces can preferably be dental objects for dental restoration for use in a patient's mouth, such as dental crowns and/or dental bridges. The workpieces can also be orthodontic appliances, such as spring retainers and aligners. Moreover, the workpieces can be models of a patient's teeth and/or upper and/or lower jaw, for instance to serve as models for a desired state of said teeth and/or upper and/or lower jaw to aid in manufacturing, for instance, splints, nightguards, retainers and other orthodontic appliances by means of the 3D printing system or by other manufacturing means.

The 3D printing system and the 3D printing device can be configured to simultaneously or sequentially manufacture the at least two workpieces. In the case of sequentially manufacturing the at least two workpieces, the at least two workpieces can be manufactured in a single manufacturing process without intervening in the manufacturing process. Thus, one workpiece can be manufactured and then a further workpiece can be manufactured and then both workpieces can be moved to one or more post-processing stages.

The 3D printing system further comprises at least two workpiece holders. Each workpiece holder has a manufacturing surface onto which at least one workpiece can be additively manufactured. Each workpiece holder also has an attachment means to releasably attach the workpiece holder to the build plate.

Thus, instead of printing a workpiece onto a build surface of the build plate, the 3D printing systems comprises separate workpiece holders, namely at least two workpiece holders, having their own manufacturing surfaces onto which the workpieces can be printed.

By providing the workpiece holders with an attachment means to releasably attach the workpiece holders to the build plate, the workpiece holders can easily be removed from the build plate, such as by exerting a pushing force, i.e. a sliding motion, or a pulling force onto the workpiece holders and can then be displaced from the 3D printing system, for instance to one or more post-processing stages.

In most cases, a plurality of post-processing steps can be performed on the workpiece. After the workpiece has been printed, the workpiece can be displaced to a stage for removing excess material from the workpiece, such as by moving the workpiece and thereby generating a mass inertial force in the excess material in order to remove undesired adherent excess material on the surface of the workpiece. Alternatively, a material removing medium, such as a solvent and/or an air jet and/or an abrasive material, can be applied to the workpiece in order to remove excess material.

The workpiece can then be displaced, for instance by means of a handling robot, to a curing stage, in which the workpiece is exposed to a curing light, preferably UV light, which can harden the material in order to make the material of the workpiece stronger and stiffer.

The workpiece can then be displaced to a surface finishing stage, in which the surface of the workpiece is finished to a necessary degree of surface quality, such as by sandblasting the workpiece.

Furthermore, post-processing can include coating the respective workpiece with a material, such as polymer and/or a metal oxide layer, to improve surface finish, to seal out moisture and/or to act as an anti-microbial seal. Coating can be performed, for instance, by means of a chemical vapour deposition process.

The above-described post-processing steps are to be understood as being merely exemplary. Thus, the workpiece can be displaced to further post-processing stages or less post-processing stages than described above. Furthermore, the workpieces can be displaced to the above-described post-processing steps in a different sequence than described above.

In 3D printing systems known from prior art, the workpiece is removed from the build plate prior to post-processing and then displaced to the respective post-processing stages. Thus, in most cases, each post-processing stage comprises its own interface configured to fix the workpiece in place during the respective post-processing step.

However, in the case of the invention at hand, the workpieces do not have to be removed from the build surface of the build plate, such as by scraping the workpieces from the build surface of the build plate by means of a spatula, after each printing process.

For one, this reduces the downtime of the 3D printing device compared with prior art systems, in which the user, such as a technician, is generally required to carefully remove the workpieces from the build plate and subsequently clean the build plate. Since most workpieces have not been cured at this stage, removing the workpieces from the build plate without damaging the workpieces or the build plate can be laborious and time-consuming. Thus, since the invention at hand proposes to use a common interface onto which the workpieces are printed and on which the workpieces can be displaced, for instance to post-processing stages, the manufacturing speed of the workpieces can be increased by eliminating or at least reducing downtime in order to enhance productivity and efficiency of manufacturing.

Thus, replacing a chemical bonding interface to attach and release the workpieces to and from the 3D printing system by a mechanically attachable and removable interface as proposed by in the present disclosure provides easier release mechanisms that allow for quick and easy removal of the workpieces from the build plate.

Moreover, in some manufacturing processes, such as those configured for making trays or clear tray aligners via thermoforming, separating the workpieces from their respective workpiece holders can be completely omitted in the 3D printing system disclosed herein. Thus, if the cost of the workpiece holders is negligible, such as by producing a low-cost workpiece holder, the production cost can be further reduced significantly, Furthermore, by eliminating or at least reducing residual material on the build plate, contamination of the resin used to manufacture the workpiece, for instance due to residual material and/or cleaning material, can be eliminated or at least reduced.

Furthermore, damage to the workpieces can also be avoided or at least reduced since the workpieces are not exposed to physical force, such as a scraping force in order to remove the workpieces from the build plate. The workpieces may need to be removed from the workpiece holders once the entire manufacturing processing is completed, i.e. after the post-processing, such as curing. However, since the workpieces are in a more robust and/or hardened state after post-processing, specifically after curing, physical forces applied to the workpieces after post-processing cause no or at least significantly reduced damages to the workpieces compared to the removal process as described in the beginning.

Hence, the quality of the manufactured workpieces can be enhanced and/or repairing processes to repair damages to the workpieces can be eliminated or at least reduced.

Moreover, since the workpieces can be arranged on different workpiece holders, the manufacturing process can be individualized according to the workpieces to be manufactured. Thus, for instance, after printing a plurality of workpieces onto the workpiece holders, some of the workpieces may require certain post-processing steps while others require different post-processing steps. Thus, the manufacturing process can be configured flexibly so that the workpieces can be moved to different post-processing stages on their respective workpiece holders according to their requirements.

Preferably, the attachment means can comprise an adapter configured to be releasably attached to the build plate and to releasably receive at least a portion of the workpiece holders in order to releasably attach the workpiece holders to the build plate.

Thus, the adapter can aid in attaching the workpiece holders to the build plate by providing an interface between the workpiece holders and the build plate. This can, for instance, enable the workpiece holders to be attached to a conventional build plate of an existing 3D printing device without modifying or by only minimally modifying the build plate.

Furthermore, the adapter can provide a common mechanical connection interface for a plurality of workpiece holders to the build plate, thus allowing the plurality of workpieces to be removed from the build plate by simply removing the adapter from the build plate. Thus, instead of removing each single workpiece holder from the build plate individually, the adapter carrying all or at least a plurality of workpieces can be removed from the build plate by removing the adapter. This further reduces downtime of the 3D printing device, thus increasing efficiency and productivity.

The adapter can be sized to cover a substantial portion of the surface of the build plate facing the workpiece to be manufactured, i.e. the surface of the build plate onto which the workpieces are typically printed in conventional 3D printing systems. The adapter can preferably be sized to cover at least 40% of the surface of the build plate, more preferably at least 50% of the surface of the build plate, more preferably at least 60% of the surface of the build plate, more preferably at least 70% of the surface of the build plate, most preferably at least 50% of the surface of the build plate. Preferably, the adapter can be substantially rectangular-shaped. However, other polygonal shapes can also be feasible.

Preferably, a portion of the workpiece holders can be received in the adapter while a further portion thereof can extend beyond a surface of the build plate facing a light source for hardening the workpiece.

Preferably, the adapter can comprise at least one recess configured to slidably receive at least a portion of the workpiece holders.

The portion of the workpiece holders can be slidably received in the at least one recess by displacing the workpiece holders substantially translationally into the recess. However, the term "slidably receive" can also encompass displacing the workpiece holders by substantially rotating the workpiece holders into the recess as they are being received in the recess. Moreover, a combined movement comprising a translational and a rotational movement to receive the workpiece holders in the recess, such as in the case of bayonet catch, is also covered by the term "slidably receive".

Alternatively, the workpiece holders can be attached to the adapter by screwing at least a portion of each of the workpiece holders into at least a portion of the adapter. For this purpose, preferably, the adapter can comprise a screw thread portion configured to engage with a screw thread portion arranged on or in a portion of each of the workpiece holders. Preferably, the workpiece holders can each comprise a male screw thread and the adapter can comprise corresponding female screw threads configured to engage the male screw threads of the workpiece holders. Alternatively, the workpiece holders can each comprise a female screw thread and the adapter can comprise corresponding male screw threads configured to engage the female screw threads of the workpiece holders.

The recess can preferably be an L- or T-shaped slot in order to provide a connection between the workpiece holders and the adapter.

The recess can also be configured to provide a press-fit, preferably a slight press-fit such as a transitional fit, in order to fix the portion of the workpiece holders in the recess while allowing the workpiece holders to be slid along the recess, for instance in order to position or remove the workpiece holders from the adapter.

Preferably, the recess can extend from an end surface of the adapter through at least a portion of the adapter. Thus, for instance, the portion of the workpiece holders to be received in the recess can be slid into the recess at the end surface of the adapter to a position within the recess. Preferably, the recess can extend from a first end surface of the adapter to a second end surface of the adapter opposite the first end surface. Thus, the workpiece holders can be slid into the recess from the first end surface and can be removed from the recess from the second end surface. This allows for an efficient and fast loading and removal process of the workpiece holders.

Preferably, each workpiece holder can comprise a receiving section configured to be received in the recess of the adapter, a manufacturing section defining the manufacturing surface and a connecting section configured to extend out of the recess when the receiving section is received in the recess and to connect the receiving section with the manufacturing section arranged outside of the recess.

Thus, the manufacturing section defining the manufacturing surface can extend out of the recess at a defined distance in order to prevent hardenable material from adhering to the build plate and/or to the adapter. The receiving section, the manufacturing section and the connecting section can be configured as a single component made from a single material. However, the receiving section, the manufacturing section and the connecting section can also be separate parts, optionally also made of different materials, and can be connected to one another, for instance by providing a form fit and/or frictional connection and/or a material bond between each of the sections.

The workpiece holder, and thus at least some of its sections, can also be additively manufactured. Thus, the workpiece holder can be manufactured as a low-cost disposable part. Some of the sections can be non-additively manufactured and can be connected to the sections additively manufactured, for instance by the connection means as described above.

Preferably, a first section of at least one workpiece holder can be swivable and/or rotatable relative to a second section of the workpiece holder.

Preferably, the manufacturing section can be swivable and/or rotatable relative to the receiving section.

Thus, the manufacturing section can be swivelled and/or rotated relative to the receiving section, for instance in order to adjust an angle of the manufacturing surface relative to the direction of hardening light directed to the workpiece. This can increase the flexibility of the manufacturing process by increasing accessibility of the hardening light to the workpieces to be manufactured.

Preferably, each workpiece holder and/or the adapter and/or the build plate can comprise at least one protrusion extending from a surface thereof and each workpiece holder and/or the adapter and/or the build plate can comprise at least one opening configured to receive the at least one protrusion to releasably attach each workpiece holder to the build plate.

By means of the protrusion and the opening, the workpiece holder can be attached to the build plate in order to print the workpiece onto the manufacturing surface of the workpiece holder. Once the workpiece is printed onto the manufacturing surface, the workpiece holder including the printed workpiece can be removed from the build plate, for instance in order to displace the workpiece holder and the printed workpiece to post-processing stages, for instance by means of a pulling force in order to overcome a frictional and/or a magnetic force. In case the 3D printing system includes the adapter as described above, the workpiece holders can be removed from the build plate by removing the workpiece holders from the adapter, which is arranged between the workpiece holders and the build plate. Alternatively, the workpiece holders can be removed from the build plate by removing the entire adapter from the build plate, thereby also removing the workpiece holders.

Preferably, the protrusion can be a cylindrical dowel pin which can be received in the opening. Preferably, the protrusion and the opening can form a press-fit in order to provide a securing means between the workpiece holder and the build plate. Alternatively, the dowel pin, or at least a portion thereof, may be conical, or incorporate a draft angle, rather than being purely cylindrical. Additionally or optionally, a magnetic element can be provided to provide a magnetic connecting force.

A "magnetic element" is an element capable of becoming or being magnetic. Once it is magnetic it produces a magnetic field. Examples include iron, nickel, cobalt, chromium, manganese, and magnetic alloys such as alnico, samarium-cobalt or neodymium-iron-boron magnets. Magnetic elements include permanent magnets and electromagnets. For ensuring the magnetic connecting force, the magnetic element typically needs a magnetic counterpart to which the magnetic connecting force of the magnetic element extends.

The magnetic element can individually be present in the workpiece holder, the adapter or the build plate, or can be present in the workpiece holder and the adapter, or the workpiece holder and the build plate, or the build plate and the adapter. Preferably, a frictional fit and a magnetic force can be provided to attach the workpiece holders to the build plate.

Preferably, the protrusion can comprise at least one recess formed around at least a portion of a circumference of the protrusion. The opening can further comprise at least one detent configured to engage the recess when the protrusion is received in the opening to retain the workpiece holder.

Thus, the detent can provide a locking means to lock the workpiece holder in place. The detent can also provide a positive registration to a user or a handling robot that the workpiece holder is properly locked in place, such as by sound or by haptic feedback. This can ensure that the workpiece holder, and in particular its manufacturing surface, is in the correct position. Thus, this can ensure, for instance by means of an attachment registration device, that the manufacturing surfaces of the workpiece holders are arranged substantially in one plane once they are attached to the build plate in order to achieve a high printing quality of the workpieces to be manufactured.

The detent is preferably deflectable, preferably in a direction substantially perpendicular to a longitudinal axis of the protrusion. Alternatively or additionally, the protrusion can also be deflectable, preferably in a direction substantially perpendicular to a longitudinal axis of the protrusion.

Preferably, a plurality of detents can be provided arranged around the circumference of the recess.

Preferably, the workpiece holder and/or the adapter and/or the build plate can comprise at least one registration sensor configured to identify sufficient attachment and positioning of the workpiece holder such that the workpiece holder, and in particular its manufacturing surface, is substantially in a predetermined position on the build plate. For instance, the registration sensor can be a switch or a photoelectric barrier arranged in the opening of the workpiece holder and/or the adapter and/or the build plate. Alternatively or additionally, the registration sensor can be arranged outside of the adapter and the build plate at a distance from the workpiece holders. In this case, the registration sensor can be an optical element, such as a photoelectric barrier, configured to detect whether the workpiece holders are arranged substantially in a single plane in a predetermined position.

Alternatively, or additionally, the 3D printing system can comprise a reader, such as an RFID reader, and the workpiece holders can each be provided with at least one readable tag, such as an RFID tag. Thus, for instance, the RFID reader can detect the presence of the workpiece holders via detection of the respective RFID tag to identify sufficient attachment and positioning of the workpiece holders.

The registration sensor can be configured to signal a warning in case the workpiece holders are not positioned according to predetermined values and/or tolerances.

Preferably, a handling robot can be provided in order to displace the workpiece holder and the printed workpiece. The handling robot can preferably be configured to grip the workpiece holder, for instance by gripping edges of the workpiece holder in order to exert a force, such as a pulling force, onto the workpiece holder in order to remove the workpiece holder from the build plate. Alternatively, the workpiece holder can be displaced manually by a user.

Furthermore, the workpiece holder can comprise a removal coupling means, such as one or more further protrusions or openings extending from a surface or into a surface of the workpiece holder, preferably extending from the manufacturing surface and/or from a side surface of the workpiece holder substantially perpendicular to the manufacturing surface, for the handling robot or other removal tool, such as a manual engaging tool, to couple with. Thus, the removal coupling means can provide a coupling means for the handling robot to couple to the workpiece holder, for instance by means of a frictional or form fit, and to exert a force, such as a pulling force, onto the workpiece holder in order to remove the workpiece holder from the build plate, and to preferably displace the workpiece holder and the printed workpiece to post-processing stages.

The removal coupling means can preferably be a structure, such as one or more protrusions, printed onto the workpiece holder by means of the 3D printing system, preferably during the manufacturing process of the workpiece.

The removal coupling means can also comprise a magnetic element, such as an electromagnet or a permanent magnet, to couple the workpiece holder with the handling robot. Moreover, the handling robot can comprise a magnetic element and the workpiece holder can comprise a ferrous material to couple the workpiece holder to the handling robot.

Preferably, at least one of the workpiece holders, the adapter and the build plate can comprise at least one magnetic element to releasably attach the workpiece holders to the build plate.

The magnetic element can provide a magnetic attachment force in order to attach the workpiece holders to the build plate. Once the workpiece is printed onto the manufacturing surface, the workpiece holder including the printed workpiece can be removed from the build plate, for instance in order to displace the workpiece holder and the printed workpiece to post-processing stages.

The magnetic element can include a permanent magnet. Alternatively, or additionally, the magnetic element can be an electromagnet in which the magnetic force to attach the workpiece holders to the build plate can selectively be produced by an electric current.

In one embodiment, the build plate can comprise a plurality of magnetic elements arranged in a grid pattern on the build plate. Thus, the arrangement of the magnetic elements can provide predetermined positions on the build plate at which the workpiece holders can be attached. This further enhances the manufacturing quality and the manufacturing speed of the 3D printing system.

Preferably, the build plate can comprise a plurality of magnetic elements and each workpiece holder can comprise at least one magnetic element. The plurality of magnetic elements can preferably be arranged on the build plate such that the ends of at least two magnetic elements arranged on the build plate facing the magnetic element of the workpiece holders, once the workpiece holders are attached to the build plate, have different magnetic poles.

Preferably, the magnetic elements arranged on the build plate can be arranged such that the ends of at least two magnetic elements adjacent to each other, the ends facing the magnetic elements of the workpiece holders once the workpiece holders are attached to the build plate, have different magnetic poles than the ends of at least two further magnetic elements adjacent to each other.

Thus, the different magnetic poles can provide predetermined positions on the build plate at which the workpiece holders can be attached since magnetic poles only allow the attachment of opposite poles. Thus, for instance, positive poles of the magnetic elements arranged on the build plate would repel a positive pole of the magnetic element of the workpiece piece holder. In contrast, negative poles of the magnetic elements arranged on the build plate would attract a positive pole of the magnetic element of the workpiece piece holder. Thus, the workpiece holder could only be attached to the negative poles of the magnetic elements arranged on the build plate.

Optionally, the attachment means can comprise a vacuum generator configured to generate a vacuum force in at least one opening formed in the build plate to releasably attach the workpiece holders to the build plate. Preferably, the build plate can comprise a plurality of openings distributed across at least a portion of the build plate.

Thus, the workpiece holders can be selectively attached to the build plate by activating or deactivating the vacuum generator in order to activate or deactivate a suction force to attach the workpiece holders to the build plate. The vacuum generator can include a vacuum source, such as a vacuum pump, for instance a piston pump, a diaphragm pump, or a rotary vane pump. The vacuum generator can also include a valve arranged between the vacuum source and the build plate to selectively allow and disallow the suction force to be applied to the build plate.

Preferably, the workpiece holders can be continuous rail-shaped bars, each preferably having a substantially I-shaped or L-shaped cross-section. Thus, the continuous rail-shaped bars can provide an elongate manufacturing surface, for instance in order to print a plurality of workpieces and/or in order to print an elongate workpiece onto the workpiece holders.

In the case of an I-shaped or L-shaped cross-section, at least two sections substantially perpendicular to each other of the workpiece holder can be provided so that one section can provide an attachment section for attaching the workpiece holder to the build plate and/or a guiding means for guiding the workpiece holder. A section perpendicular to the attachment section can extend away from the build plate and can provide the manufacturing surface for the workpieces to be printed on.

However, further shapes of the workpiece holders are possible. For instance, the workpiece holders can have a dovetail-shaped attachment section in order to attach the workpieces to the build plate by means of a dovetail connection.

In one embodiment, the portions of each of the workpiece holders received in the recess can be configured to form a pushed unit in at least one recess of the adapter.

A pushed unit is to be understood as being at least two adjacent workpiece holders, wherein at least portions of the workpiece holders abut each other. The workpiece holders can be displaced in and/or out of the recess by exerting a pushing force on one of the workpiece holders, wherein the force is transferred to the other workpiece via the abutting portions thereof. Thus, the at least two adjacent abutting workpiece holders are displaced as a single unit in the recess.

This enables an efficient and quick means for displacing the workpiece holders, for instance in order to remove the workpiece holders from the recess of the adapter once the workpieces have been printed onto the manufacturing surfaces.

Preferably, the adapter can comprise a plurality of recesses each extending from an end surface of the adapter through at least a portion thereof. Preferably, the plurality of recesses can be arranged parallel to each other, each configured to slidably receive a portion of at least one of the at least two workpiece holders.

Thus, a plurality of workpieces can be attached to the build plate by sliding a portion of the workpiece holders into one of the recesses.

Preferably, the recesses can extend from a first end surface of the adapter to a second end surface of the adapter opposite the first end surface. Thus, the workpiece holders can be slid into the recesses from the first end surface and can be removed from the recesses from the second end surface. This allows for an efficient and fast loading and removal process of the workpiece holders.

Preferably, the manufacturing surface can have any of the shapes of rectangular, circular, arch-shaped or horseshoe-shaped. By providing manufacturing surfaces with a variety of available shapes, workpieces having different shapes can be printed more easily and efficiently.

Thus, for instance, by providing shapes of the workpiece holders tailored to the shapes of the workpieces to be manufactured, the area occupied on the build plate by each workpiece holder is minimized so that, for instance, more workpieces can be manufactured per manufacturing process.

Thus, the workpiece holders can preferably have manufacturing surfaces of different shapes depending on the shape of the workpiece to be manufactured on the respective manufacturing surface.

The manufacturing surfaces can also have different sizes depending on the size and number of workpieces to be manufactured.

Preferably, at least one of the workpiece holders can be manufactured by additive manufacturing.

Preferably, at least the manufacturing surface of at least one of the at least two workpiece holders can comprise at least one of the following materials: ceramic, preferably zirconia, plastic, and metal.

In one embodiment, the adapter can be mounted to the build plate by means of a clamping mechanism and/or by means of a magnetic connection. The magnetic connection can comprise an electromagnet configured to generate a magnetic force to attach the adapter to the build plate. However, the magnetic connection can also include a permanent magnet.

The clamping mechanism can comprise a press-fit or a form-fit between the adapter and the build plate. For instance, a portion of the adapter can be received in an opening of the build plate or vice versa to provide a press-fit and/or a form-fit. Alternatively, or additionally, a separate element can attach the adapter to the build plate, such as a screw clamp. Moreover, the adapter can be slidably attached to the build plate, such as by means of a portion of the adapter and/or the build plate being slidably received in a portion of the other of the build plate and the adapter. Thus, the adapter can be releasably attached to the build plate.

Hence, the adapter can be released from the build plate by exerting a pulling force and/or a sliding force on the adapter. Thus, for instance, instead of removing the workpieces from the build plate by removing the workpiece holders from the adapter, the entire adapter carrying all or at least a plurality of workpieces can be released from the build plate, for instance in order to displace the workpieces to post-processing stages.

Preferably, the 3D printing system can further comprise a replacement tool configured to remove the workpiece holders having a workpiece attached to their manufacturing surfaces from the adapter by sliding the workpiece holders parallel to the build plate.

Preferably, the replacement tool can be configured to slide at least one empty workpiece holder not having a workpiece attached to its manufacturing surface into the adapter.

In one embodiment, the replacement tool can comprise at least one recess extending from an end surface of the replacement tool through at least a portion thereof and configured to slidably receive a portion of at least one empty workpiece holder not having a workpiece attached to its manufacturing surface and/or at least one workpiece holder having a workpiece attached to its manufacturing surface.

Preferably, the recess can extend from a first end surface of the replacement tool to a second end surface of the replacement tool opposite the first end surface.

Preferably, the replacement tool can comprise a plurality of recesses each extending from an end surface of the replacement tool through at least a portion thereof. The plurality of recesses can be arranged parallel to each other and can be configured to each slidably receive a portion of at least one empty workpiece holder not having a workpiece attached to its manufacturing surface and/or at least one workpiece holder having a workpiece attached to its manufacturing surface.

Preferably, the recesses can extend from a first end surface of the replacement tool to a second end surface of the replacement tool opposite the first end surface.

Preferably, the replacement tool can be configured to align the at least one recess of the replacement tool with the at least one recess of the adapter. Thus, the workpieces can be slid from the one or more recesses of the replacement tool into the one or more recesses of the adapter. This enables a fast and efficient loading and removal process of the workpiece holders.

Preferably, the replacement tool can comprise an opening configured to at least partially receive the adapter and a plurality of recesses. Preferably, the at least one recess can be arranged on each side of the opening, the at least one recess arranged on one side of the opening being aligned with the at least one recess arranged on the opposite side of the opening.

In one embodiment, the adapter and/or the build plate can comprise a locking element configured to lock the workpiece holder in place. This allows the workpiece holders to be fixed during the manufacturing process in order to prevent or at least minimize movement of the workpiece holders.

In one embodiment, the 3D printing system can further comprise post-processing devices including at least any of a device for removing excess material from the workpiece, a curing device, a surface finishing device, a thermoforming device and a marking device. The at least two workpiece holders and the respective post-processing device can be configured such that the workpieces can be post-processed by the respective post-processing device with the workpieces attached to the same workpiece holders onto which the workpiece was additively manufactured.

Preferably, the device for removing excess material from the workpiece can comprise a centrifuge having a rotor configured to receive the workpiece and to generate a mass inertial force in the excess material of the workpiece, thereby cleaning the workpiece from excess material.

Preferably, the surface finishing device can comprise a sandblasting station configured to direct a sandblast onto the workpiece. Alternatively, the surface finishing device can be configured to direct other abrasive media, such as glass beads, crushed glass, plastic abrasives and/or silicon carbide, onto the workpiece to achieve a desired surface quality of the workpiece. The surface finishing device can comprise a gate, such as a sandblasting gate, configured to be attached to the workpiece holder. The sandblasting gate can comprise a structure having an opening to allow the abrasive media to reach the workpiece. Thus, the gate can limit the exposure of the workpiece to the abrasive media to predetermined portions of the workpiece and/or can concentrate the abrasive media onto at least a portion of the workpiece.

Preferably, the thermoforming device can be configured for vacuum forming or positive pressure forming, for instance for manufacturing orthodontic appliances, such as trays or tray aligners. Thus, for instance, the model of a patient's teeth and/or lower jaw and/or upper jaw can be printed by means of the 3D printing device. The model can be used to form the tray and/or tray aligner by means of heating a material the tray and/or tray aligner is to be made of and subsequently drawing the material over the model by means of a vacuum or positive pressure, wherein the material can preferably be a transparent thermoplastic material. After the tray and/or tray aligner has been formed, the tray and/or tray aligner and the model can be separated from each other. Subsequently, the tray and/or tray aligner can be trimmed to remove excess material.

Alternatively, instead of or in addition to the thermoforming device, the 3D printing system can further include a vapour depositing device. Thus, for instance, trays or tray aligners can be manufactured by depositing a material, such as a polymer, such as parylene, onto a model of a patient's teeth and/or lower jaw and/or upper jaw printed by means of the 3D printing device. After the tray and/or tray aligner has been formed on the model by means of the vapour depositing device, the tray and/or tray aligner and the model can be separated from each other. Subsequently, the tray and/or tray aligner can be trimmed to remove excess material.

Alternatively, the orthodontic appliances, such as trays and/or tray aligners, can be printed directly by means of the 3D printing device without the need for thermoforming.

The 3D printing system can also include a CNC milling station or polishing station to process the printed workpiece as a post-processing device. Thus, for instance, the workpiece can be additively manufactured in a first step having a substantially coarse surface. In the CNC milling step at the CNC milling station the surface of the coarse workpiece can be milled to achieve the required surface quality of the workpiece. Thus, the additive manufacturing step can be performed quicker while achieving a sufficient surface quality via the milling step.

In one embodiment, the 3D printing system can further comprise a controller configured to select at least one workpiece holder from a plurality of workpiece holders having different sizes and shapes based on the workpiece to be manufactured.

For instance, each workpiece holder can comprise an identifier which specifies the type of the respective workpiece holder, such as the size and shape of the manufacturing surface of the respective workpiece holder. The identifier can be a bar-code, a QR-code, a text, a color code or any other visual identifier. Moreover, the identifier can additionally or alternatively comprise an RFID tag. Thus, the identifier of each workpiece holder can be read, either manually by a user or for instance by an optical scanning device, in order to determine the type of the respective workpiece holder.

This can also enable the workpiece holders to be tracked. Thus, for instance, the workpiece holders with the workpieces attached to their corresponding manufacturing surfaces can be sent to a different location, such as a different factory, for instance to perform a processing or post-processing step. In this case, the identifier can enable the workpiece holders to be identified, tracked and/or monitored.

Furthermore, the controller, or a software associated therewith, can comprise an algorithm configured to select a workpiece holder best suited for the workpiece to be printed. For instance, the algorithm can be configured to simulate a test-fit of the workpiece to be printed to the available workpiece holders and select the workpiece holder best suited for the workpiece.

Preferably, the controller can be configured to select the at least one workpiece holder from the plurality of workpiece holders based on a smallest achievable distance between the outer edges of the workpiece to the outer edges of the workpiece holder in order to occupy the least amount of area required on the workpiece holder. By basing the criterion for the suitability of a workpiece holder for a certain workpiece to be printed on a minimal distance between the outer edges of the workpiece to the edges of the workpiece holder in order to occupy the least amount of area required on the workpiece holder, a high packing density of workpieces can be achieved on the build plate. Thus, the number of workpieces and the speed of manufacturing can be increased.

In one embodiment, the 3D printing system can further comprise at least one handling robot configured to handle the workpiece holders and attach the workpiece holders to the build plate, and preferably also to move the workpiece holders to post-processing devices.

In one embodiment, the 3D printing system can comprise a position detecting device configured to detect the position of the workpiece holders on the build plate and to detect deviations of the detected position from a predetermined target position of the workpiece holders on the build plate. The position detecting device can preferably further be configured to apply a correction factor to the handling robot in order to correct the positioning of at least one further workpiece holder which is subsequently placed on the build plate by the handling robot.

Thus, the positioning of the workpiece holders on the build plate can be optimized. This further enhances the quality, speed and efficiency of the manufacturing process. The correction factors and/or the positioning of the workpieces on the build plate can be stored in a memory provided by the 3D printing system.

The object as set out at the beginning is also achieved by an adapter set for attaching workpiece holders to a 3D printing device. The advantages and features described in relation to the 3D printing system apply accordingly to the adapter described below.

The adapter set comprises:
  a) at least one adapter configured to be mounted to a build plate of the 3D printing device;
  b) at least two workpiece holders, each workpiece holder configured to be releasably received by the adapter and each workpiece holder providing a manufacturing surface onto which at least one workpiece can be additively manufactured.

Preferably, the adapter can comprise at least one recess configured to receive at least a portion of each of the workpiece holders.

Preferably, the recess can extend from an end surface of the adapter through at least a portion of the adapter.

The object as set out at the beginning is also achieved by a method for manufacturing at least two workpieces by means of any of the 3D printing systems disclosed herein. The advantages and features described in relation to the 3D printing system apply accordingly to the method described below.

The method comprises the steps:
  a) successively hardening a plurality of layers of hardenable material onto at least two manufacturing surfaces of the at least two workpiece holders to form at least one workpiece on each manufacturing surface;
  b) removing the at least two workpiece holders with the workpiece attached to their manufacturing surfaces from the build plate of the 3D printing device by applying a force to the workpiece holders.

In one embodiment, step b) can preferably be performed by sliding a portion of each of the workpiece holders received in a recess extending from an end surface of an adapter attached to the build plate along and out of the recess.

Preferably, the portions of the at least two workpiece holders forming a pushed unit can be slid along and out of the recess.

Preferably, step b) can be performed by means of a replacement tool. The replacement tool can have at least one recess extending from an end surface of the replacement tool through at least a portion thereof and receiving at least a portion of at least one empty workpiece holder not having a workpiece attached to its manufacturing surface. The at least one recess of the replacement tool can be aligned with the at least one recess of the adapter and the empty workpiece holder can be slid along and out of the recess of the replacement tool and into the recess of the adapter thereby pushing and sliding the workpiece holder with the workpiece attached to its manufacturing surface along and out of the recess of the adapter.

Preferably, the workpiece holder can be fixed in place during the printing process, such as by means of a fixing or locking element.

In one embodiment, the at least one workpiece holder with the workpiece attached to its manufacturing surface can be received in at least one further recess of the replacement tool after the at least one workpiece holder with the workpiece attached to its manufacturing surface is pushed and slid along and out of the recess of the adapter.

Preferably, step b) can be performed by pulling the workpiece holders, thereby releasing at least one protrusion extending from a surface of the build plate and/or the workpiece holders from at least one opening formed in the build plate and/or the workpiece holders.

Preferably, step b) can be performed by pulling the workpiece holders to overcome a magnetic connection between the workpiece holders and the build plate.

In one embodiment, after step b) the method can comprise the steps:
- c) displacing the workpiece holders with the workpieces attached to their manufacturing surfaces to a post-processing stage of the workpieces including at least any of removing excess material from the workpieces, curing, marking and surface finishing;
- d) post-processing the workpieces by means of at least any of removing excess material from the workpieces, curing, marking and surface finishing with the workpieces attached to the manufacturing surfaces of the same workpiece holders onto which the workpieces were formed in step a).

Preferably, in steps c) and d) at least one of the at least two workpiece holders with at least one workpiece attached to the manufacturing surface of each workpiece holder can be displaced to a different post-processing stage and can be post-processed at the respective different post-processing stage than another workpiece holder.

Preferably, step b), and optionally also step c), can be performed by means of at least one handling robot configured to handle the workpiece holders.

The following list of aspects provides alternative and/or further features of the invention:

1. A 3D printing system comprising a 3D printing device for manufacturing at least one workpiece, wherein the 3D printing device comprises a build plate and wherein the 3D printing system further comprises at least one workpiece holder having a manufacturing surface onto which at least one workpiece can be additively manufactured and an attachment means to releasably attach the workpiece holder to the build plate.
2. The 3D printing system according to aspect 1, comprising at least two separate workpiece holders, each workpiece holder having a manufacturing surface onto which at least one workpiece can be additively manufactured and an attachment means to releasably attach each of the workpiece holders to the build plate.
3. The 3D printing system according to aspect 1 or 2, wherein the attachment means comprises an adapter configured to be releasably attached to the build plate and to releasably receive at least a portion of the workpiece holder in order to releasably attach the workpiece holder to the build plate.
4. The 3D printing system according to aspect 3, wherein the adapter comprises at least one recess configured to slidably receive at least a portion of the workpiece holder.
5. The 3D printing system according to aspect 4, wherein the recess extends from an end surface of the adapter through at least a portion of the adapter.
6. The 3D printing system according to aspect 4 or 5, wherein the workpiece holder comprises a receiving section configured to be received in the recess of the adapter, a manufacturing section defining the manufacturing surface and a connecting section configured to extend out of the recess when the receiving section is received in the recess and to connect the receiving section with the manufacturing section arranged outside of the recess.
7. The 3D printing system according to any of the preceding aspects, wherein a first section of the workpiece holder is swivable and/or rotatable relative to a second section of the workpiece holder.
8. The 3D printing system according to aspect 7, wherein the manufacturing section is swivable and/or rotatable relative to the receiving section.
9. The 3D printing system according to any of the preceding aspects, wherein the workpiece holder and/or the adapter and/or the build plate comprises at least one protrusion extending from a surface thereof and the workpiece holder and/or the adapter and/or the build plate comprises at least one opening configured to receive the at least one protrusion to releasably attach the workpiece holder to the build plate.
10. The 3D printing system according to aspect 9, wherein the protrusion comprises at least one recess formed around at least a portion of a circumference of the protrusion and wherein the opening comprises at least one detent configured to engage the recess when the protrusion is received in the opening to retain the workpiece holder.
11. The 3D printing system according to any of the preceding aspects, wherein at least one of the workpiece holder, the adapter, and the build plate comprises at least one magnetic element to releasably attach the workpiece holder to the build plate.
12. The 3D printing system according to aspect 11, wherein the build plate comprises a plurality of magnetic elements arranged in a grid pattern on the build plate.
13. The 3D printing system according to aspect 12, wherein the build plate comprises a plurality of magnetic elements and the workpiece holder comprises at least one magnetic element, and wherein the plurality of magnetic elements are arranged on the build plate such that the ends of at least two magnetic elements arranged on the build plate facing the magnetic element of the workpiece holder, once the workpiece holder is attached to the build plate, have different magnetic poles.
14. The 3D printing system according to aspect 13, wherein the magnetic elements arranged on the build plate are arranged such that the ends of at least two magnetic elements adjacent to each other, the ends facing the magnetic element of the workpiece holder once the workpiece holder is attached to the build plate, have different magnetic poles than the ends of at least two further magnetic elements adjacent to each other.
15. The 3D printing system according to any of the preceding aspects, wherein the workpiece holder is a continuous, rail-shaped bar, preferably having a substantially I-shaped or L-shaped cross-section.
16. The 3D printing system according to any of the preceding aspects, wherein the adapter comprises a plurality of recesses each extending from an end surface of the adapter through at least a portion thereof, wherein the plurality of recesses are arranged parallel to each other, each configured to slidably receive a portion of the workpiece holder.
17. The 3D printing system according to any of the preceding aspects, wherein the manufacturing surface has any of the shapes of rectangular, circular, arch-shaped or horseshoe-shaped.
18. The 3D printing system according to aspect 17, wherein the workpiece holder has a manufacturing surface of different shapes depending on the shape of the workpiece to be manufactured on the respective manufacturing surface.
19. The 3D printing system according to any of the preceding aspects, wherein the workpiece holder and/or the adapter is manufactured by additive manufacturing.
20. The 3D printing system according to any of the preceding aspects, wherein at least the manufacturing surface of the workpiece holder comprises at least one of the following materials: ceramic, preferably zirconia, plastic, and metal.
21. The 3D printing system according to any of aspects 3 to 20, wherein the adapter is mounted to the build plate by means of a clamping mechanism and/or by means of a magnetic connection.
22. The 3D printing system according to any of the preceding aspects, further comprising a replacement tool configured to remove the workpiece holder having a workpiece attached to its manufacturing surfaces from the adapter by sliding the workpiece holder parallel to the build plate.
23. The 3D printing system according to aspect 22, wherein the replacement tool is configured to slide at least one empty workpiece holder not having a workpiece attached to its manufacturing surface into the adapter.
24. The 3D printing system according to aspects 22 or 23, wherein the replacement tool comprises at least one recess extending from an end surface of the replacement tool through at least a portion thereof and configured to slidably receive a portion of at least one empty workpiece holder not having a workpiece attached to its manufacturing surface and/or at least one workpiece holder having a workpiece attached to its manufacturing surface.
25. The 3D printing system according to any of aspects 22 to 24, wherein the replacement tool comprises a plurality of recesses each extending from an end surface of the replacement tool through at least a portion thereof, wherein the plurality of recesses are arranged parallel to each other and are configured to each slidably receive a portion of at least one empty workpiece holder not having a workpiece attached to its manufacturing surface and/or at least one workpiece holder having a workpiece attached to its manufacturing surface.
26. The 3D printing system according to aspect 24 or 25, wherein the replacement tool is configured to align the at least one recess of the replacement tool with the at least one recess of the adapter.
27. The 3D printing system according to any of aspects 24 to 26, wherein the replacement tool comprises an opening configured to at least partially receive the adapter and a plurality of recesses, wherein at least one recess is arranged on each side of the opening, the at least one recess arranged on one side of the opening being aligned with the at least one recess arranged on the opposite side of the opening.
28. The 3D printing system according to any of the preceding aspects, wherein the adapter and/or the build plate comprises a locking element configured to lock the workpiece holder in place.
29. The 3D printing system according to any of the preceding aspects, further comprising post-processing devices including at least one of a curing device, a heating device, a marking device, a device for removing excess material from the workpiece, a surface finishing device, a support removal device, and a surface treatment device, wherein the workpiece holder and the respective post-processing device are configured such that the workpiece can be post-processed by the respective post-processing device with the workpiece attached to the same workpiece holder onto which the workpiece was additively manufactured.
30. The 3D printing system according to any of the preceding aspects, further comprising a controller configured to select at least one workpiece holder from a plurality of workpiece holders having different sizes and shapes based on the workpiece to be manufactured.
31. The 3D printing system according to aspect 30, wherein the controller is configured to select the at least one workpiece holder from the plurality of workpiece holders based on a smallest achievable distance between the outer edges of the workpiece to the outer edges of the workpiece holder in order to occupy the least amount of area required on the workpiece holder
32. The 3D printing system according to any of the preceding aspects, further comprising at least one handling robot configured to handle the workpiece holder and attach the workpiece holder to the build plate, and preferably also to move the workpiece holder to post-processing devices.
33. The 3D printing system according to aspect 32, further comprising a position detecting device configured to detect the position of the workpiece holder on the build plate and to detect deviations of the detected position from a predetermined target position of the workpiece holder on the build plate, and wherein the position detecting device is preferably further configured to apply a correction factor to the handling robot in order to correct the positioning of at least one further workpiece holder which is subsequently placed on the build plate by the handling robot.
34. The 3D printing system according to any of the preceding aspects, wherein the attachment means comprises a vacuum generator configured to generate a vacuum force in at least one opening formed in the build plate to releasably attach the workpiece holder to the build plate.
35. An adapter set for attaching workpiece holders to a 3D printing device, comprising:
 a) at least one adapter configured to be mounted to a build plate of the 3D printing device;
 b) at least one workpiece holder configured to be releasably received by the adapter and the workpiece holder providing a manufacturing surface onto which at least one workpiece can be additively manufactured.

36. The adapter set according to aspect 35, comprising at least two separate workpiece holders, each workpiece holder configured to be releasably received by the adapter and each workpiece holder providing a manufacturing surface onto which at least one workpiece can be manufactured.
37. The adapter set according to aspects 35 or 36, wherein the adapter comprises at least one recess configured to receive at least a portion of the workpiece holder.
38. The adapter set according to aspect 37, wherein the recess extends from an end surface of the adapter through at least a portion of the adapter.
39. A method for manufacturing at least one workpiece by means of the 3D printing system according to any of the preceding aspects, comprising the steps:
    a) successively hardening a plurality of layers of hardenable material onto the manufacturing surface of the at least one workpiece holder to form at least one workpiece on the manufacturing surface;
    b) removing the workpiece holder with the workpiece attached to its manufacturing surface from the build plate of the 3D printing device by applying a force to the workpiece holder.
40. The method according to aspect 39, wherein step b) is performed by sliding a portion of the workpiece holder received in a recess extending from an end surface of an adapter attached to the build plate along and out of the recess.
41. The method according to aspect 40, wherein step b) is performed by means of a replacement tool having at least one recess extending from an end surface of the replacement tool through at least a portion thereof and receiving at least a portion of at least one empty workpiece holder not having a workpiece attached to its manufacturing surface, wherein the at least one recess of the replacement tool is aligned with the at least one recess of the adapter and the empty workpiece holder is slid along and out of the recess of the replacement tool and into the recess of the adapter thereby pushing and sliding the workpiece holder with the workpiece attached to its manufacturing surface along and out of the recess of the adapter.
42. The method according to aspect 41, wherein the at least one workpiece holder with the workpiece attached to its manufacturing surface is received in at least one further recess of the replacement tool after the at least one workpiece holder with the workpiece attached to its manufacturing surface is pushed and slid along and out of the recess of the adapter.
43. The method according to aspect 39, wherein step b) is performed by pulling the workpiece holder, thereby releasing at least one protrusion extending from a surface of the build plate and/or the workpiece holder from at least one opening formed in the build plate and/or the workpiece holder.
44. The method according to aspect 39, wherein step b) is performed by pulling the workpiece holder to overcome a magnetic connection between the workpiece holder and the build plate.
45. The method according to any of aspect 39 to 44, wherein after step b) the method comprises the steps of:
    c) displacing the workpiece holder with the workpiece attached to its manufacturing surface to a post-processing stage of the workpieces including at least one of removing excess material from the workpieces, curing, heating, surface finishing, surface treatment, support removal and marking;
    d) post-processing the workpiece by means of at least one of removing excess material from the workpiece, curing, surface finishing and marking with the workpiece attached to the manufacturing surface of the same workpiece holder onto which the workpiece was formed in step a).
46. The method according to aspect 45, wherein after step d) the method comprises the step of:
    e) removing the workpiece from the workpiece holder, and optionally removing residual printing material from the workpiece holder.
47. The method according to any of aspects 39 to 46, wherein step b), and optionally also step c) and/or step e), is performed by means of at least one handling robot configured to handle the workpiece holder.
48. The method according to any of aspects 39 to 47, wherein at least two workpieces are manufactured by means of the 3D printing system and steps a) to e) are performed with at least two workpiece holders, with at least one workpiece formed on each manufacturing surface of each workpiece holder.
49. The method according to aspects 45 and 48, wherein in steps c) and d) at least one of the at least two workpiece holders with at least one workpiece attached to the manufacturing surface of each workpiece holder is displaced to a different post-processing stage and is post-processed at the respective different post-processing stage than another workpiece holder.

Preferred embodiments of the present invention are further elucidated below with reference to the figures.

Figure 1:
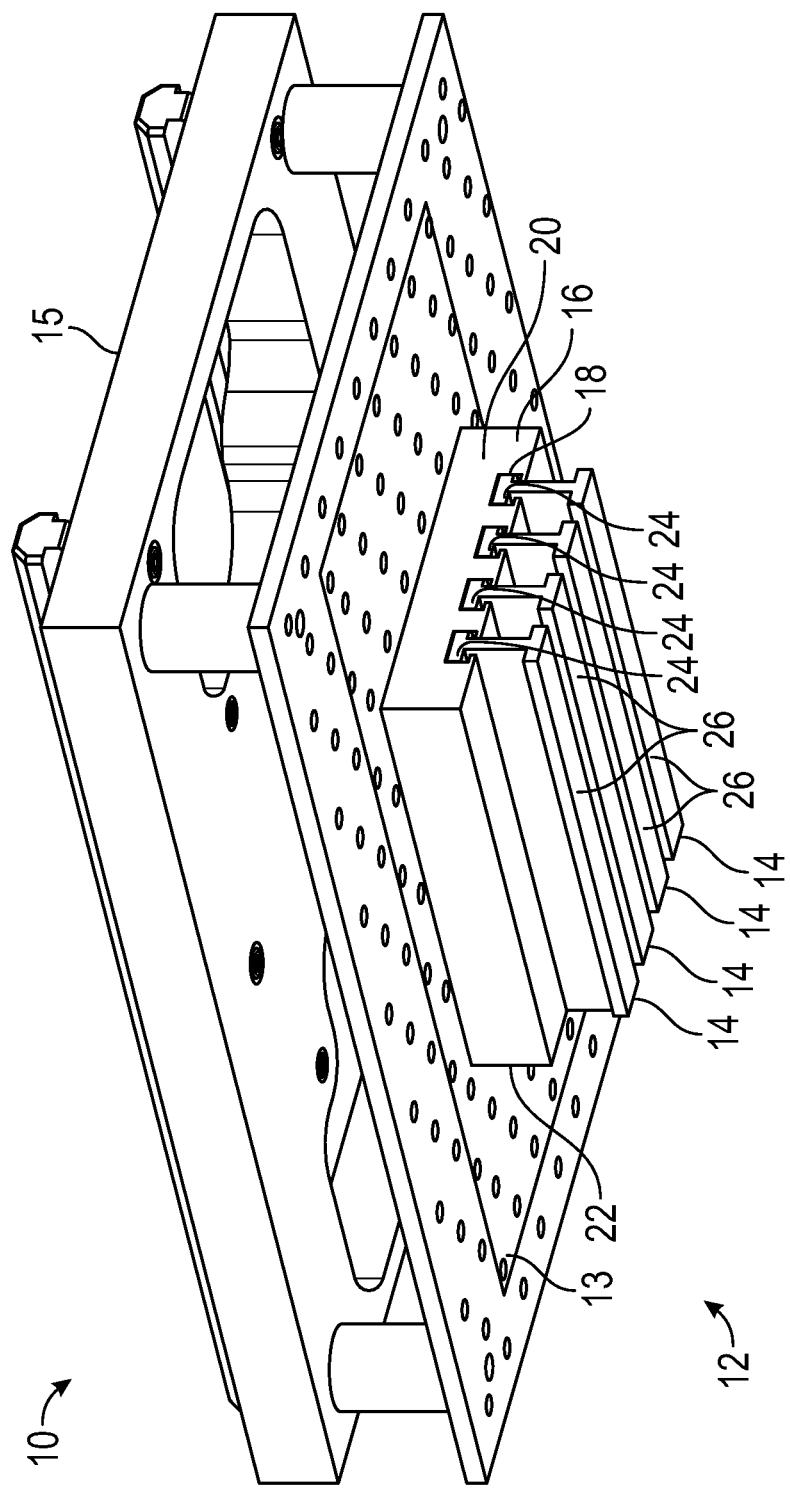
FIG. 1 shows a perspective view of an embodiment according to the invention.

FIG. 1 shows a 3D printing system 10 comprising a 3D printing device 12 having a build plate 13 attached to a build platform 15. The 3D printing system 10 comprises four workpiece holders 14 configured as continuous rail-shaped bars.

The 3D printing system 10 further comprises an adapter 16 having four recesses 18 formed therein. The recesses 18 extend from a first end surface 20 of the adapter 16 to a second end surface 22 of the adapter 16 which is opposite from the first end surface 20.

The workpiece holders 14 each have a receiving section 24 received in the recesses 18 of the adapter 16. The workpiece holders 14 furthermore each define a manufacturing surface 26 onto which workpieces can be printed.

Although the following figures may show the above-described parts, some reference signs are omitted in the figures for clarity purposes.

Figure 2:
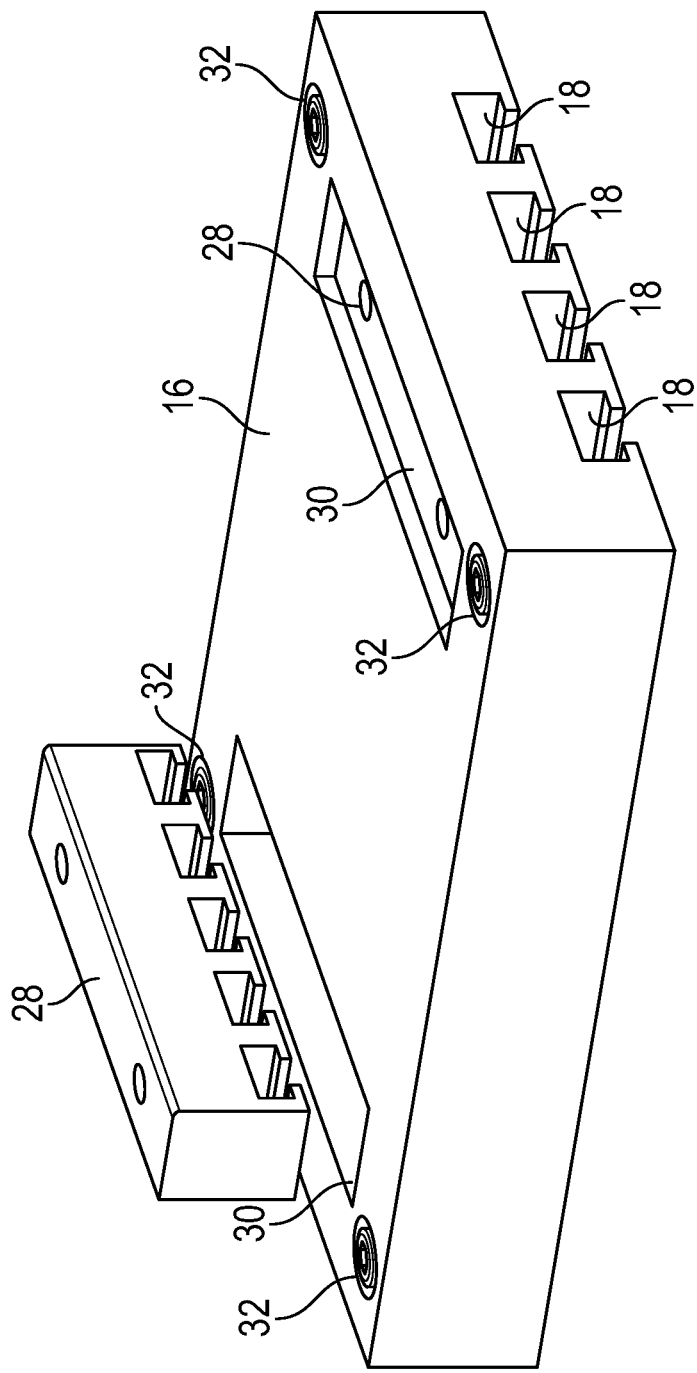
FIG. 2 shows a perspective view of a further embodiment according to the invention.

FIG. 2 shows the adapter 16 of FIG. 1. The adapter 16 further comprises two locking elements 28 which can be received in locking openings 30 formed in the adapter 16. The locking elements 28 can fixate the workpiece holders 14 in the recesses 18.

The adapter 16 further comprises fastening elements 32 configured to fasten the adapter 16 to the build plate 13. Alternatively, or additionally, the adapter 16 and/or the build plate 13 can have a magnetic element, such as an electromagnet or a permanent magnet to fasten the adapter 16 to the build plate 13.

Figure 3:
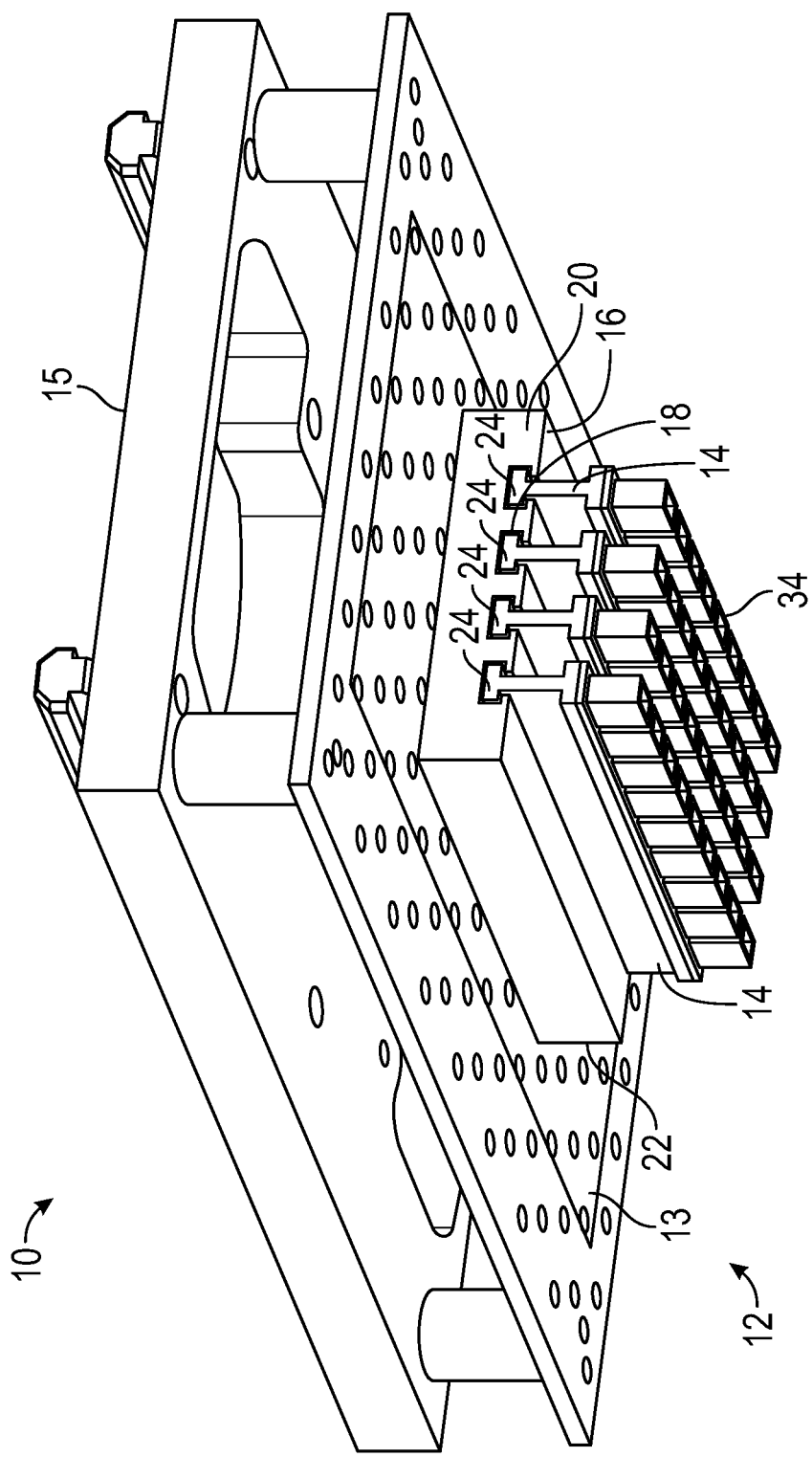
FIG. 3 shows a perspective view of a further embodiment according to the invention.

FIG. 3 shows the 3D printing system 10 of FIG. 1 with workpieces 34 printed onto the manufacturing surfaces 26 of the workpiece holders 14. Thus, the manufacturing surfaces 26 are not visible in FIG. 3 since they are covered by the workpieces 34.

Figure 4:
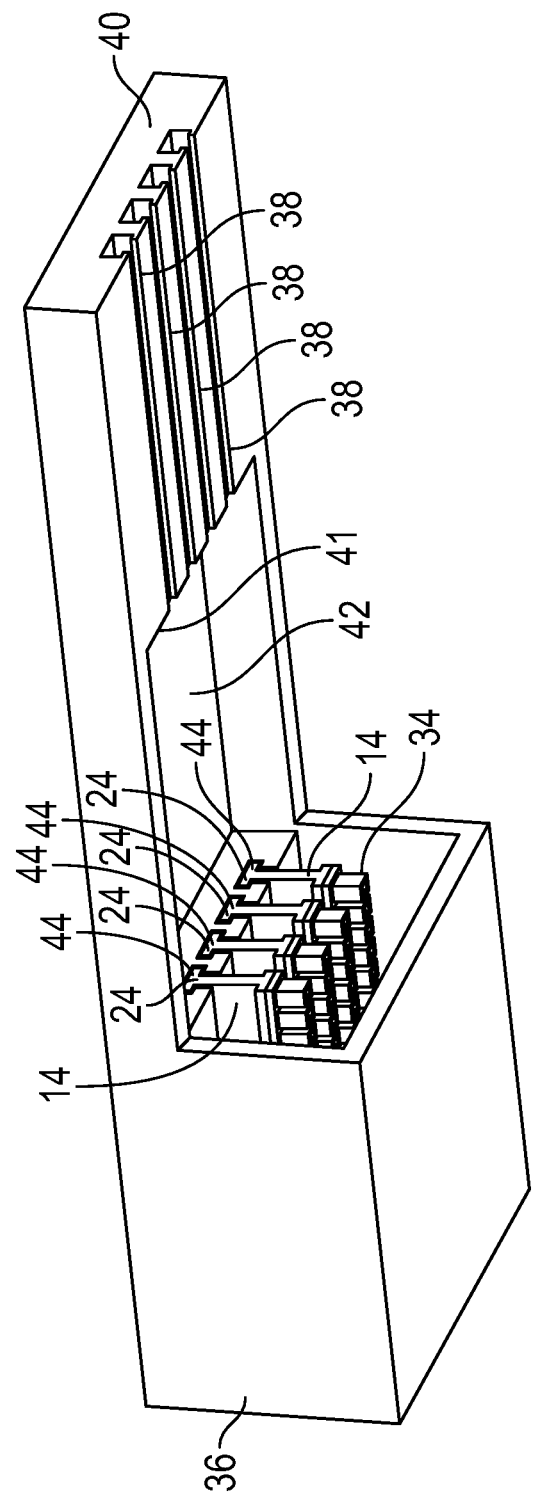
FIG. 4 shows a perspective view of a removal tool according to a further embodiment of the invention.

FIG. 4 shows a removal tool 36 configured to remove the workpiece holders 14 having workpieces 34 attached to their manufacturing surfaces 26 from the adapter 16.

As shown in FIG. 4, the removal tool 36 comprises four recesses 38 extending from a first end surface 40 of the replacement tool 36 to a second end surface 41 of the removal tool 36. The recesses 38 are arranged parallel to each other and are configured to each slidably receive the receiving sections 24 of empty workpiece holders 14 not having a workpiece 34 attached to their manufacturing surfaces 26.

The replacement tool 36 further comprises an opening 42 configured to at least partially receive the adapter 16. The replacement tool 36 also comprises four further recesses 44 arranged on a side of the opening 42 opposite from the recesses 38. The recesses 44 and the recesses 38 are aligned to each other on opposite sides of the opening 42.

As shown in FIG. 4, the receiving sections 24 of the workpiece holders 14 are received in the recesses 44. Thus, the workpiece holders 14 with workpieces 34 attached to the manufacturing surfaces 26 have been removed from the adapter 16.

Thus, the removal tool 36 can be transported to a post-processing stage in order to load the workpiece holders 14 onto a corresponding post-processing device while the workpiece 34 is attached to the same workpiece holder 14 onto which it was printed by the 3D printing system 10.

Figure 5:
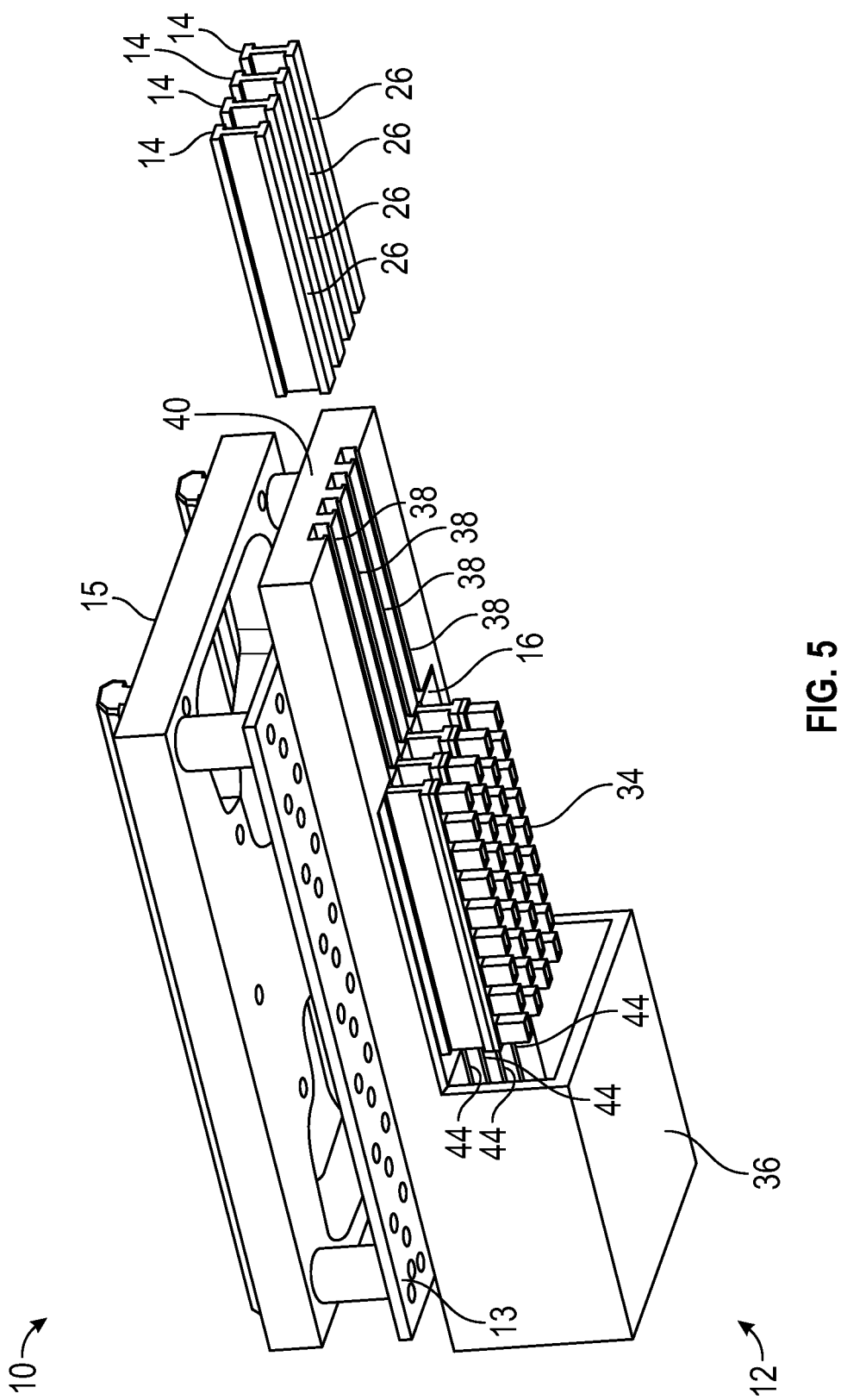
FIG. 5 shows a further perspective view of the embodiment of FIG. 4.
Figure 6:
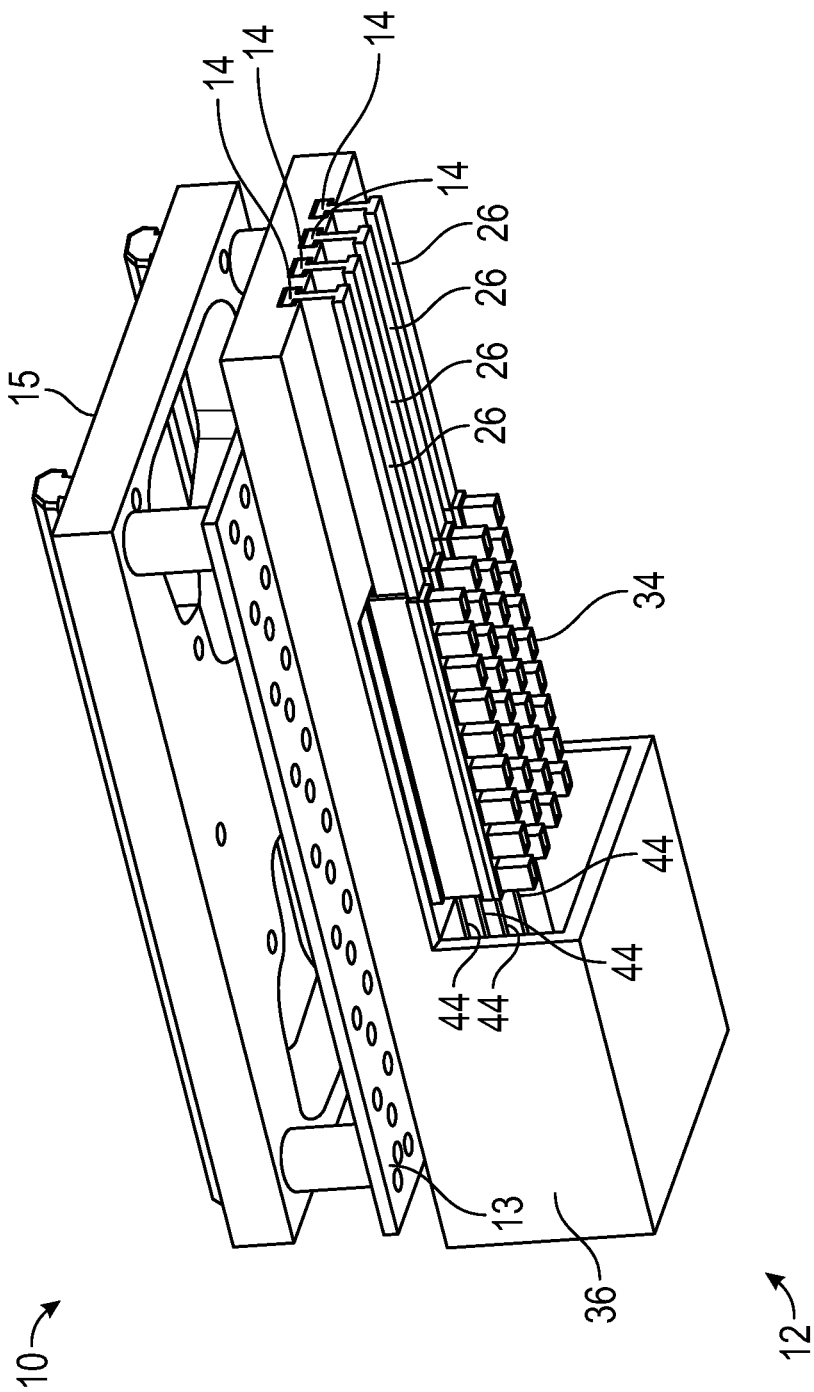
FIG. 6 shows a further perspective view of the embodiment of FIG. 4.
Figure 7:
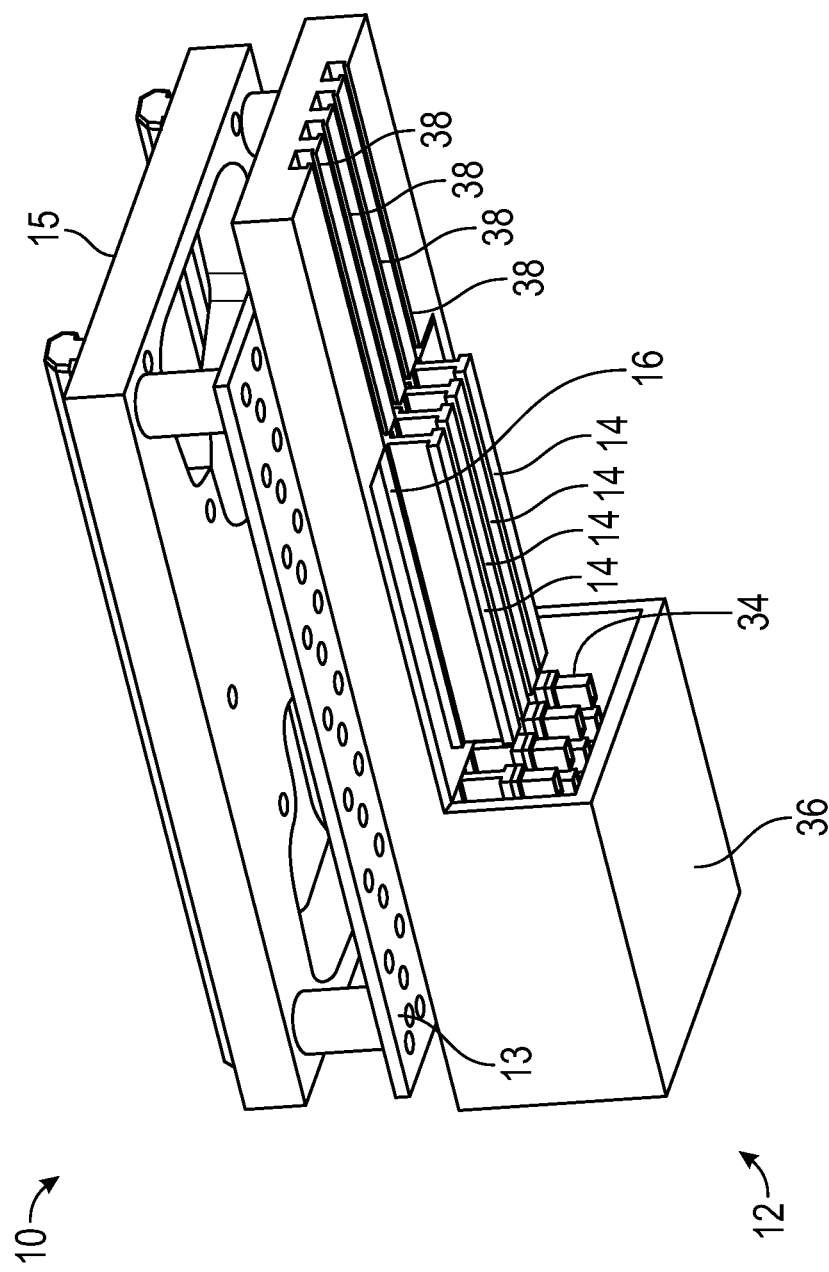
FIG. 7 shows a further perspective view of the embodiment of FIG. 4.

FIGS. 5 to 7 show the removal process by means of the removal tool 36 of FIG. 4 in three removal steps.

In FIG. 5, the adapter 16 with the workpiece holders 14 having workpieces 34 attached to their manufacturing surfaces 26 is received in the opening 42 of the removal tool 36. Four empty workpiece holders 14 not having workpieces 34 attached to their manufacturing surfaces 26 are provided to the removal tool 36. The empty workpiece holders 14 are thereby slid into the recesses 38, as can be seen in FIG. 6.

The empty workpiece holders 14 are then slid from the recesses 38 into the recesses 18 formed in the adapter 16, as shown in FIG. 7. The workpiece holders 14 having workpieces 34 attached to their manufacturing surfaces 26 are thereby slid from the recesses 18 formed in the adapter 16 into the recesses 44.

Thus, the empty workpiece holders 14 are loaded into the adapter 16 while the workpiece holders 14 having workpieces 34 attached to their manufacturing surfaces 26 are removed from the adapter 16.

Figure 8:
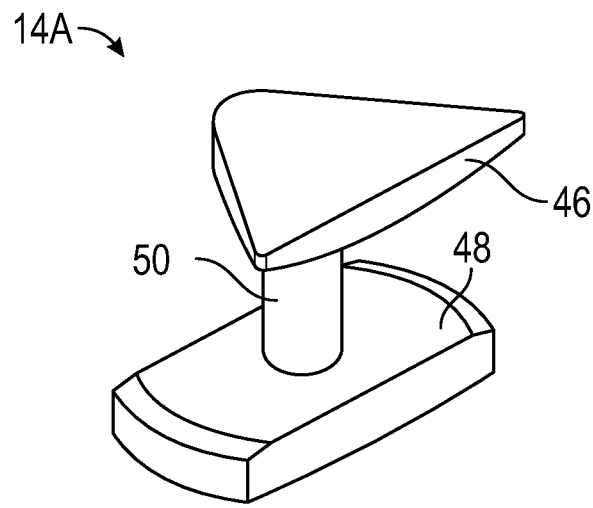
FIG. 8 shows a perspective view of a further embodiment according to the invention.

FIG. 8 shows an alternative configuration of the workpiece holders 14A. Instead of a rail-shaped bar configuration, the manufacturing surface 26 of the workpiece holder 14A shown in FIG. 8 has a substantially triangular shape. Furthermore, the workpiece holder 14A comprises three sections: a manufacturing section 46 defining the manufacturing surface 26, a receiving section 48 configured to be received in the recesses 18, 38 and 44 as described above and connecting section 50 connecting the manufacturing section 46 with the receiving section 48.

Preferably, the manufacturing section 46 can be swivable and/or rotatable relative to the receiving section 48.

Figure 9:
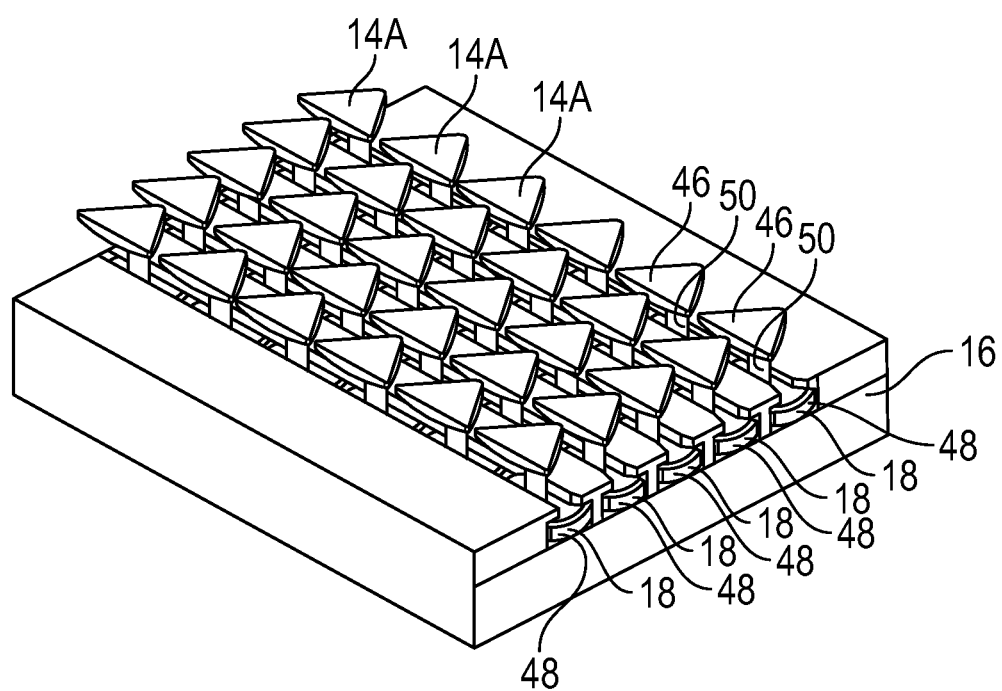
FIG. 9 shows a perspective view of a further embodiment according to the invention.

FIG. 9 shows the adapter 16 with a plurality of the workpiece holders 14A, as described in connection with FIG. 7. The receiving section 48 of the workpiece holders 14A are thereby received in the recesses 18 of the adapter 16.

Figure 10:
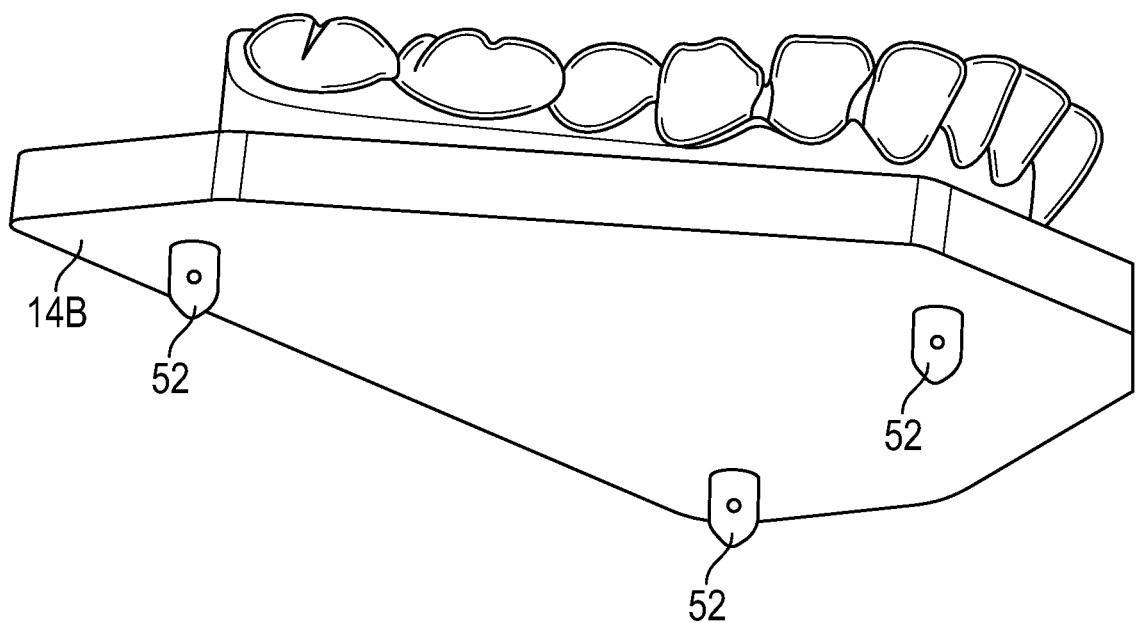
FIG. 10 shows a perspective view of a further embodiment according to the invention.
Figure 11:
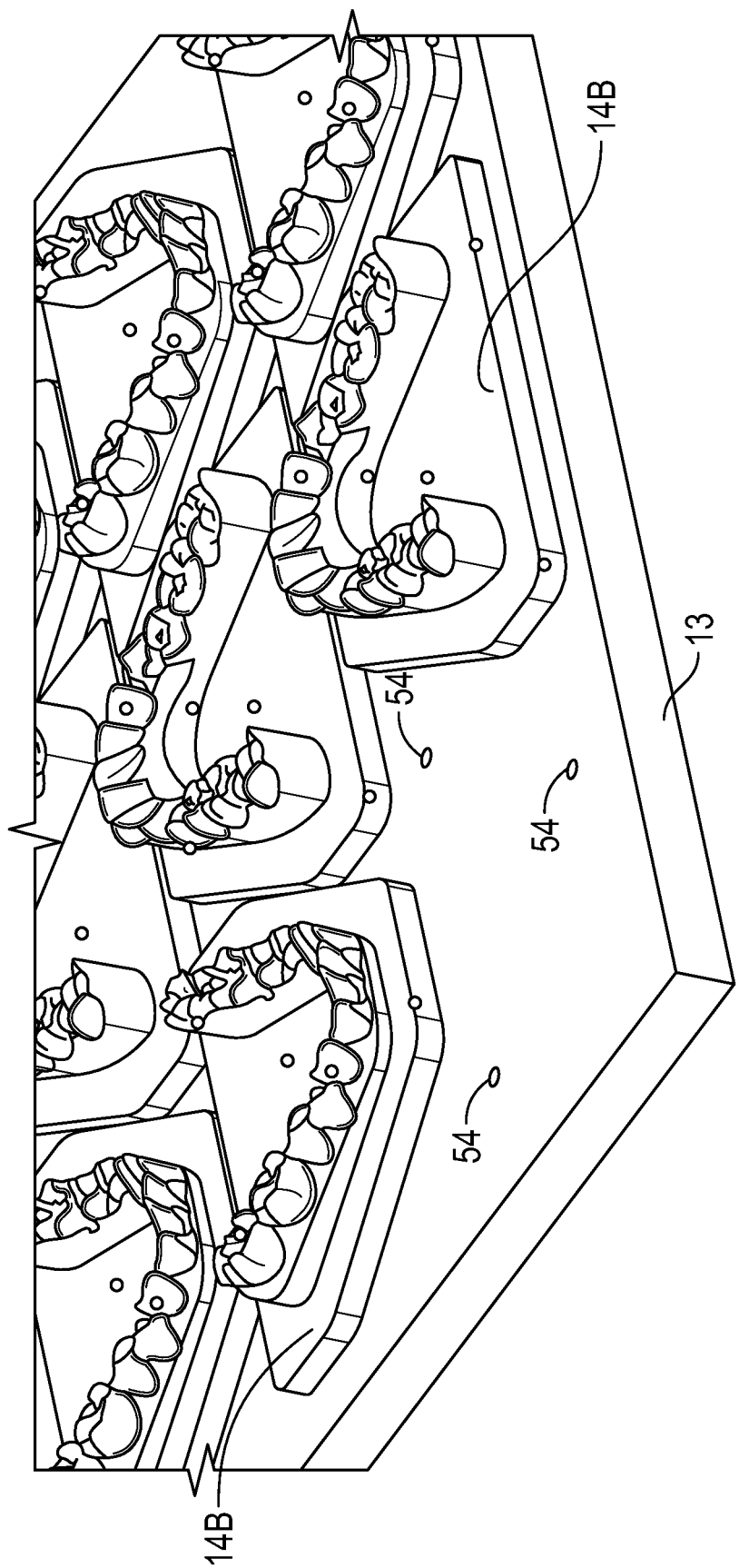
FIG. 11 shows a perspective view of a further embodiment according to the invention.

FIG. 10 shows a further alternative configuration of the workpiece holders 14B. The workpiece holders 14B comprising protrusions 52 configured to be received in openings 54 formed in the build plate 13, as shown in FIG. 11.

Figure 12:
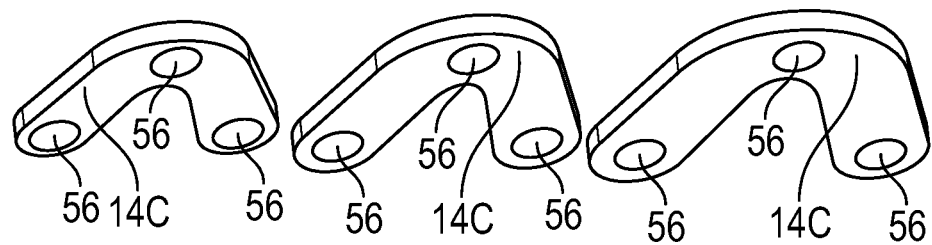
FIG. 12 shows a perspective view of a further embodiment according to the invention.

FIG. 12 shows a further alternative configuration of the workpiece holders 14C. Instead of protrusions 52, the workpiece holders 14C comprise magnetic elements 56, here configured as permanent magnets, to provide a magnetic force to attach the workpiece holders 14C to the build plate 13. The build plate 13 is preferably made of a ferrous material.

Figure 13:
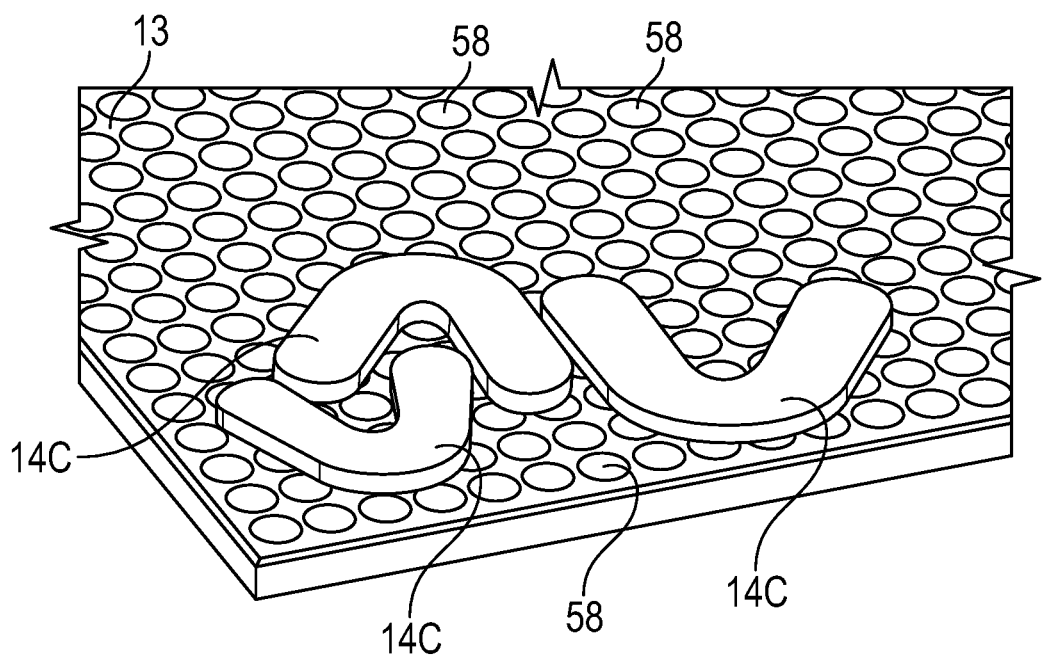
FIG. 13 shows a perspective view of a further embodiment according to the invention.

FIG. 13 shows the workpiece holders 14C attached to the build plate 13 via the magnetic elements 56 attached to the workpiece holders 14C and further magnetic elements 58 arranged on the build plate 13. Alternatively, the magnetic elements 58 of the build plate 13 can be omitted. In this case, the build plate 13 is made of a ferrous material.

The invention claimed is:

1. A 3D printing system comprising:
   a 3D printing device including a build plate;
   at least two workpiece holders, each having a manufacturing surface for additive manufacturing; and
   an attachment means to releasably attach each of the at least two workpiece holders to the build plate,
      wherein the attachment means comprises an adapter configured to be releasably attached to the build plate and to releasably receive a first portion of each of the at least two workpiece holders in order to releasably attach the at least two workpiece holders to the build plate, and
      wherein the adapter comprises a plurality of recesses, each recess configured to slidably receive the first portion of a respective one of the at least two workpiece holders, wherein to slidably receive the first portion of each of the at least two workpiece holders, the first portion is displaced into the respective recess through at least one of translational movement or rotational movement.

2. The 3D printing system according to claim 1, wherein the first portion of each of the at least two workpiece holders comprises a protrusion extending from a surface of a respective workpiece holder, and
   wherein at least one of the adapter or the build plate comprises a plurality of openings configured to receive the protrusion of each of the at least two workpiece holders to releasably attach each of the at least two workpiece holders to the build plate.

3. The 3D printing system according to claim 1, wherein at least one of the at least two workpiece holders, the adapter, or the build plate comprises at least one magnetic element to releasably attach the at least two workpiece holders to the build plate, wherein the build plate comprises a plurality of magnetic elements arranged in a grid pattern on the build plate.

4. The 3D printing system according to claim 1, wherein the workpiece holders are rail-shaped bars having a continuous length, each having either an I-shaped or L-shaped cross-section.

5. The 3D printing system according to claim 1, wherein each of the plurality of recesses extend from an end surface of the adapter through at least a portion of the adapter, wherein the plurality of recesses are arranged parallel to each other.

6. The 3D printing system according to claim 1, wherein at least the manufacturing surface of at least one of the at least two workpiece holders comprises a ceramic material.

7. The 3D printing system according to claim 1, further comprising a replacement tool configured to remove the at least two workpiece holders having a workpiece attached to the manufacturing surface of each respective workpiece holder from the adapter by sliding the at least two workpiece holders parallel to the build plate, wherein the replacement tool is configured to slide at least one empty workpiece holder, not having a workpiece attached to the manufacturing surface, into the adapter.

8. The 3D printing system according to claim 1, wherein the 3D printing system further comprises a replacement tool configured to remove the at least two workpiece holders having a workpiece attached to the manufacturing surface of each respective workpiece holder from the adapter by sliding the workpiece holders parallel to the build plate, wherein the replacement tool is configured to slide at least one empty workpiece holder, not having a workpiece attached to the manufacturing surface, into the adapter, wherein the workpiece holders are rail-shaped bars having a continuous length, each having either an I-shaped or L-shaped cross-section.

9. A method for manufacturing at least two workpieces by means of the 3D printing system according to claim 8, the method comprising:
  successively hardening a plurality of layers of hardenable material onto the manufacturing surface of each of the at least two workpiece holders to form a respective workpiece on each manufacturing surface; and
  removing the at least two workpiece holders with the respective workpiece attached to the manufacturing surface of each of the at least two workpiece holders from the build plate of the 3D printing device by applying a force to the workpiece holders by sliding the first portion of each workpiece holder received in the respective recess extending from an end surface of the adapter attached to the build plate along and out of the respective recess.

10. The method according to claim 9, wherein after removing the at least two workpiece holders, the method comprises:
  displacing the workpiece holders with the respective workpieces attached to the manufacturing surface of each of the at least two workpiece holders to a post-processing stage of the workpieces, including at least one of removing excess material from the workpieces, curing, surface finishing, or marking; and
  post-processing the workpieces by means of at least one of removing excess material from the workpieces, curing, surface finishing, and marking with the workpieces attached to the respective manufacturing surfaces of the at least two workpiece holders on which the workpieces were formed when hardening the plurality of layers.

* * * * *